(12) United States Patent
Koltermann (10) Patent No.: US 11,268,632 B2
(45) Date of Patent: Mar. 8, 2022

(54) MICROFLUIDIC ANALYSIS COMPONENT AND PRODUCTION METHOD

(71) Applicant: Efficient Robotics GmbH, Kornwestheim (DE)

(72) Inventor: Alois Koltermann, Syke (DE)

(73) Assignee: Efficient Robotics GmbH, Kornwestheim (DE)

( * ) Notice: Subject to any disclaimer, the term of this patent is extended or adjusted under 35 U.S.C. 154(b) by 78 days.

(21) Appl. No.: 16/587,898

(22) Filed: Sep. 30, 2019

(65) Prior Publication Data

US 2020/0149658 A1 May 14, 2020

Related U.S. Application Data

(63) Continuation-in-part of application No. 14/917,433, filed as application No. PCT/EP2014/068405 on Aug. 29, 2014, now Pat. No. 10,427,157.

(30) Foreign Application Priority Data

Sep. 9, 2013 (DE) ...................... 10 2013 217 959.6

(51) Int. Cl.
*B01L 3/00* (2006.01)
*F16K 99/00* (2006.01)
*F16K 37/00* (2006.01)

(52) U.S. Cl.
CPC .... *F16K 99/0017* (2013.01); *B01L 3/502715* (2013.01); *F16K 37/0091* (2013.01)

(58) Field of Classification Search
CPC ............. F16K 99/0017; F16K 19/0003; F16K 19/0001; F16K 37/0091; F16K 37/0075;
(Continued)

(56) References Cited

U.S. PATENT DOCUMENTS 8,043,846 B2   10/2011   Irimia
8,746,285 B2 *  6/2014   Hong ................... F16K 99/0059
                                                            137/897
(Continued)

FOREIGN PATENT DOCUMENTS

CA         2 450 676 A1      9/2002
DE   10 2005 061 629 A1      6/2007
WO    WO 2009/137415 A2     11/2009

OTHER PUBLICATIONS

Canadian Office Action issued in Canadian Application No. 2,922,783 dated Aug. 20, 2020 (six (6) pages).
(Continued)

*Primary Examiner* — Christine T Mui
(74) *Attorney, Agent, or Firm* — Crowell & Moring LLP (57) ABSTRACT

A microfluidic analysis device and manufacturing method are provided. The microfluidic analysis device includes a capillary substrate, a cover substrate adjacent to a cover side of the capillary substrate and/or a bottom substrate adjacent to a bottom side of the capillary substrate, a capillary structure with at least one capillary, forming a hollow channel, in the interior of the capillary substrate and/or at the interface of the capillary substrate with the cover substrate and/or at the interface of the capillary substrate with the bottom substrate and also a fluid-conducting arrangement for conducting a fluid through the capillary structure. The fluid-conducting arrangement may be designed for compartmenting the fluid by way of controlled pressure pulses. A linear sensor element, which extends toward a capillary of the capillary structure and/or away from it and/or along the capillary, and a fluid contact end of which and at least an adjacent part of its feed lie in an identical plane to the capillary, may be integrated in the microfluidic analysis device, the element finishing with its fluid contact end flush (Continued)

against a side wall of the capillary or extending into the hollow channel thereof.

22 Claims, 6 Drawing Sheets

(58) Field of Classification Search
CPC .. F16K 37/00; B01L 3/502715; B01L 3/5027; B01L 3/502; B01L 3/50
USPC .......................................... 422/502, 500, 50
See application file for complete search history.

(56) References Cited

U.S. PATENT DOCUMENTS

| | | | |
|---|---|---|---|
| 8,852,952 | B2 | 10/2014 | Pollack et al. |
| 2002/0142471 | A1 | 10/2002 | Handique et al. |
| 2004/0005582 | A1 | 1/2004 | Shipwash |
| 2006/0182738 | A1 | 8/2006 | Holmes |
| 2006/0205085 | A1 | 9/2006 | Handique |
| 2007/0092411 | A1 | 4/2007 | Leach |
| 2008/0014589 | A1 | 1/2008 | Link et al. |
| 2010/0158756 | A1* | 6/2010 | Taylor ................ B01L 3/527 422/69 |
| 2010/0233026 | A1 | 9/2010 | Ismagliov et al. |
| 2011/0065211 | A1 | 3/2011 | Nieuwenhuis |
| 2012/0040472 | A1* | 2/2012 | Churski ................ B01F 5/0646 436/180 |
| 2013/0190212 | A1 | 7/2013 | Handique et al. |

OTHER PUBLICATIONS

International Search Report (PCT/ISA/210) issued in PCT Application No. PCT/EP2014/068405 dated Dec. 2, 2014 with English translation (eight pages).
German-language Written Opinion (PCT/ISA/237) issued in PCT Application No. PCT/EP2014/068405 dated Dec. 2, 2014 (six pages).
Granieri et al., "High-Throughput Screening of Enzymes by Retroviral Display Using Droplet-Based Microfluidics", Chemistry & Biology 17, Brief Communication, Mar. 26, 2010, pp. 229-235, Elsevier Ltd.
Joensson et al., "Droplet-Microfluidics—A Tool for Single-Cell Analysis", Angewandte Reviews, Angew. Chem. Int. Ed., 2012, 51, pp. 12176-12192, Wiley-VCH Verlag GmbH & Co. KGaA, Weinheim.
Agresti et al., "Ultrahigh-throughput screening in drop-based microfluidics for directed evolution", PNAS, Mar. 2, 2010, pp. 4004-4009, vol. 107, No. 9, Harvard School of Engineering and Applied Sciences, Cambridge MA.

* cited by examiner

MICROFLUIDIC ANALYSIS COMPONENT AND PRODUCTION METHOD

CROSS REFERENCE TO RELATED APPLICATIONS

This application is a continuation-in-part of U.S. patent application Ser. No. 14/917,433, filed Mar. 8, 2016 (now U.S. Pat. No. 10,472,157), which is a National Stage of International Application No. PCT/EP2014/068405, filed Aug. 29, 2014, which claims priority from German Patent Application No. 10 2013 217 959.6, filed Sep. 9, 2013, the disclosure of which are expressly incorporated by reference herein.

BACKGROUND AND SUMMARY OF THE INVENTION

The invention relates to a microfluidic analysis device, which comprises a capillary substrate, a cover substrate adjacent to a cover side of the capillary substrate and/or a bottom substrate adjacent to a bottom side of the capillary substrate, a capillary structure with at least one capillary, forming a hollow channel, in the interior of the capillary substrate and/or at the interface of the capillary substrate with the cover substrate and/or at the interface of the capillary substrate with the bottom substrate and also a fluid-conducting arrangement for conducting a fluid through the capillary structure, and relates to an associated manufacturing method.

In the chemical, biological and pharmaceutical industry, so-called high-throughput analyzers are in use, capable of carrying out up to 100 000 analyses a day by an automated combination and linkup of processing stations. The stations serve for the handling, dispensing, mixing, analyzing, incubating and/or selecting of samples. However, such analyzers typically involve relatively high procurement and maintenance costs, a high space requirement, a high consumption of reagents and personnel-intensive operation. In order to achieve improvements here, efforts are increasingly being made to replace parts of this analysis process chain by droplet handling in microfluidic structures. These systems include capillary structures that are physically or chemically etched into a base material such as glass or silicon.

In the article by H. M. Joensson and H. Andersson Svahn, Droplet Microfluidics—A Tool for Single-Cell Analysis, in the journal Angew. Chem. Int. Ed. 2012, 51, pages 12176-12192, a description is given of such a microfluidic capillary system of which the functional elements are passively operated within narrow process windows by means of partial pressure differences and special capillary geometries. Complex process procedures, such as brief suspension of fluid streams, volume-regulated admixture of fluids or specific individual separation of partial streams, are not possible with this technique.

Such microfluidic capillary systems may be assigned an optical sensor system, for example for fluorescence measurement, which is conventionally located outside the capillary system, see for example the conference paper by Agresti et al., Ultrahigh-throughput screening in drop-based microfluidics for directed evolution (Supporting information), Proc. of the Nat. Acad. of Science of the United States of America (PNAS), volume 107, no. 9 (2010), pages 4004-4009. However, this arrangement does not allow a direct analysis of fluids by means of direct contact of the optical sensor system with the fluid, and consequently leads to poorer detection and the need for more complex equipment.

What is more, in the conventional microfluidic analysis devices, the way in which they are produced means that it is usually not possible to perform electrical analyses of the fluids within the capillaries. On account of the sensitivity of the materials to chemical or physical etching methods that are used, it is also not usually possible to carry out a structuring of the capillary system, sensors and actuators of different materials by the same method without them influencing one another. Furthermore, it is not usually possible to integrate or structure sensor and actuator elements that consist of different materials than the substrate material of the capillary system in the capillary wall in a fluid-tight manner. This significantly restricts the choice of sensor and actuator principles that can be used.

It is an object of the invention to provide a microfluidic analysis device and a method for the manufacturing thereof by which the difficulties explained above of conventional microfluidic analysis devices and corresponding manufacturing methods can be at least partially avoided.

The invention achieves this object by providing a microfluidic analysis device comprising a capillary substrate, at least one of a cover substrate adjacent to a cover side of the capillary substrate and a bottom substrate adjacent to a bottom side of the capillary substrate, a capillary structure with at least one capillary, forming a hollow channel, in the interior of the capillary substrate or at the interface of the capillary substrate with the cover substrate or at the interface of the capillary substrate with the bottom substrate and a fluid-conducting arrangement for conducting a fluid through the capillary structure, wherein the fluid conducting arrangement is designed for compartmenting the fluid by means of controlled pressure pulses, as well as by providing a method of manufacturing such microfluidic analysis device.

The invention achieves this object also by providing a microfluidic analysis device comprising a capillary substrate, at least one of a cover substrate adjacent to a cover side of the capillary substrate and a bottom substrate adjacent to a bottom side of the capillary substrate, a capillary structure with at least one capillary, forming a hollow channel, in the interior of the capillary substrate or at the interface of the capillary substrate with the cover substrate or at the interface of the capillary substrate with the bottom substrate and a fluid-conducting arrangement for conducting a fluid through the capillary structure, wherein a linear sensor element is integrated in the microfluidic analysis device and extends at least one of along a capillary of the capillary structure and toward the capillary and away from it, and lies with a fluid contact end and at least an adjacent part of its feed in an identical plane to the capillary, said linear sensor element finishing with its fluid contact end flush with a side wall of the capillary or extending into the hollow channel thereof, as well as by providing a method of manufacturing such microfluidic analysis device.

According to a corresponding aspect of the invention, the fluid-conducting arrangement of the microfluidic analysis device is designed for compartmenting the fluid by means of controlled pressure pulses. Therefore, no special capillary geometries need be provided for this purpose. The fluid conduction by means of controlled, and consequently actively produced, pressure pulses also allows much better fluid conduction, and in particular fluid compartmentation, than is possible with complex special capillary geometries and passive partial pressure differences.

In a further aspect of the invention, a linear sensor element, which extends toward a capillary of the capillary structure and/or away from it or along the capillary, and the end of which and at least an adjacent part of its feed lie in an identical plane to the capillary, is integrated in the microfluidic analysis device. In this case, the linear sensor element finishes with a fluid contact end flush against a side wall of the capillary or extends into the hollow channel thereof. This makes it possible that, during operation, the linear sensor element comes into contact at its fluid contact end directly with the fluid flowing in the capillary, whereby the sensor behavior can be much improved in comparison with sensors arranged outside the microfluidic analysis device.

In a development of the invention, the linear sensor element is an optically conducting wire material, for example an optical waveguide, or an electrically conducting wire material. As a result, optical and/or electrical sensors for the fluid analysis can be provided in the desired way in a form that is integrated in the microfluidic analysis device.

In a development of the invention, the fluid conducting arrangement is designed for providing the pressure pulses with pressures of up to 10 bar and pulse widths of between 1 μs and 10 s. This allows in particular a reliable compartmentation of the fluid with a high throughput, i.e. a high number of fluid compartments or fluid segments per unit of time.

In a development of the invention, the fluid conducting arrangement has one or more activatable valves integrated in the cover substrate and/or in the bottom substrate for opening and closing a respective capillary of the capillary structure. Consequently, such valves that control the fluid conduction are then also integrated in the microfluidic analysis device.

In an advantageous development of the invention, the microfluidic analysis device comprises at least two modules from the group consisting of a compartmentation module, a fluid admixing module, an incubator module, a fluid analysis module and a selection module. As a result, a structurally compact combination of two or more such modules can be achieved as a single component part in the microfluidic analysis device.

In a development of the invention, the microfluidic analysis device has a compartmentation module and/or a fluid admixing module with a first capillary and a second capillary, entering the first capillary at an acute angle, and the fluid conducting arrangement is designed for the pressure-controlled conducting of a first fluid in the first capillary and a second fluid in the second capillary. As a result, the two fluids can be compartmented very exactly and with a high cycle rate in the form of individual fluid segments, or brought together to form a mixed fluid.

In a development of the invention, the microfluidic analysis device has a selection module with an analysis fluid capillary and a selection fluid capillary crossing the latter, and the fluid conducting arrangement is designed for selectively decoupling individual analysis fluid segments from the analysis fluid capillary by corresponding pressure-controlled conducting of a selection fluid in the selection fluid capillary. This allows the specific separation of individual analysis fluid segments from a segmented analysis fluid stream by means of suitable active pressure pulses on the selection fluid.

In a development of the invention, the microfluidic analysis device has one or more magnetic coils as a respective sensor or actuator, the coil being integrated in or on the capillary substrate. Using such a magnetic coil and magnetic particles in a fluid conducted in the capillary allows for example the flow conditions and process conditions within the capillary structure to be controlled or monitored in a desired way.

With the method according to the invention, a microfluidic analysis device according to the invention can be advantageously produced in such a way that at least one capillary of the capillary structure is formed by a step of machining the capillary substrate and/or the cover substrate and/or the bottom substrate. This is found to be advantageous in comparison with other conventional capillary structure producing techniques, in particular with regard to complexity and the flexibility of the materials used.

In a refinement of the method according to the invention, with the forming of the capillary structure by the machining step, a previously formed linear sensor element that crosses the capillary or protrudes into it is cut open or structured on one side, i.e. cut off, in the region of the capillary. As a result, a sensor element of which the fluid contact end finishes flush with the side wall of the capillary or extends in the hollow channel thereof, and in this way can come into contact directly with the fluid conducted through during operation, can be provided very reliably.

BRIEF DESCRIPTION OF THE DRAWINGS

Advantageous embodiments of the invention are described below and are represented in the drawings, in which.

DETAILED DESCRIPTION OF THE DRAWINGS

Figure 1:
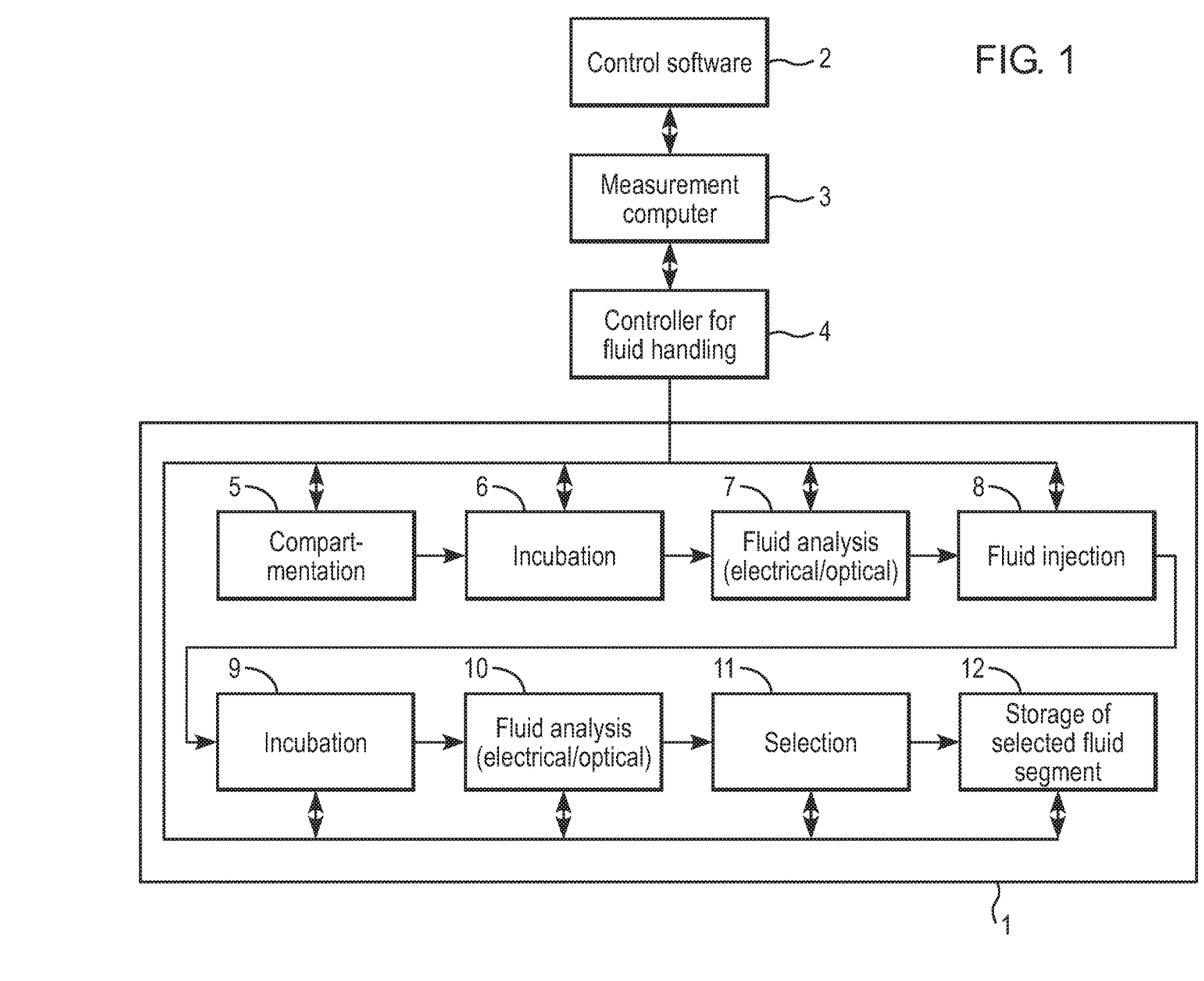
FIG. 1 shows a block diagram of a microfluidic analyzer with a microfluidic analysis device.

With the microfluidic analyzer that is schematically represented in FIG. 1, high-throughput analyses can be conducted for up to 107 analyses a day. The analyzer comprises a micro reactor part 1, assigned to which is a control, which in the example shown comprises a computer unit with control software 2, a measurement computer 3 and a control unit for fluid handling 4. In the example shown, the micro reactor part 1 includes as functional modules a compartmentation block 5, a first incubation block 6, a first fluid analysis block 7, a fluid injection or fluid admixing block 8, a second incubation block 9, a second fluid analysis block 10, a selection block 11 and a storage block 12 for selected fluid segments. The function modules 5 to 12 mentioned may be formed according to requirements from individual, physically separate modules; or a number of them or all of them may be combined in a respective common physical unit, i.e. be integrated in such a unit. The dimensions of such modules or units typically lie between 3 mm and 1000 mm in edge length. In particular, only one of these functional modules, some of the same or all of these functional modules 5 to 12 may be integrated in a microfluidic analysis device with a suitable capillary structure. The capillary structure may be realized in a way known per se, in particular with a rectangular, V-shaped or semicircular capillary cross section. In this case, the lateral dimensions and capillary depths may vary between different capillaries of the capillary structure, or else within the same capillary, from typically 1 μm to approximately 10 mm or somewhat more.

Figure 2:
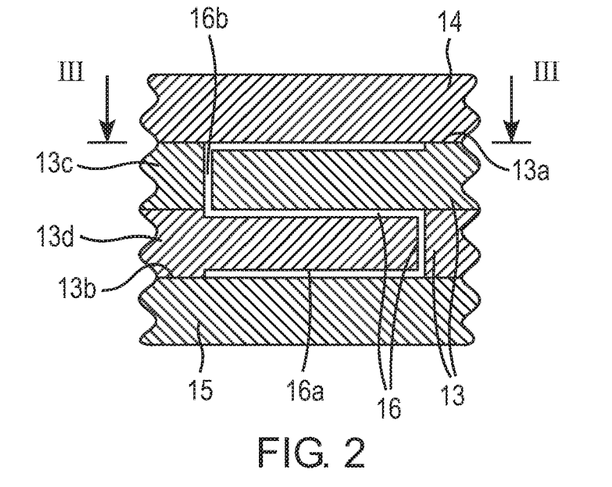
FIG. 2 shows a detail in the form of a schematic sectional view through a layer structure of a microfluidic analysis device with a three-dimensional capillary system that can be used in the analyzer of FIG. 1.
Figure 3:
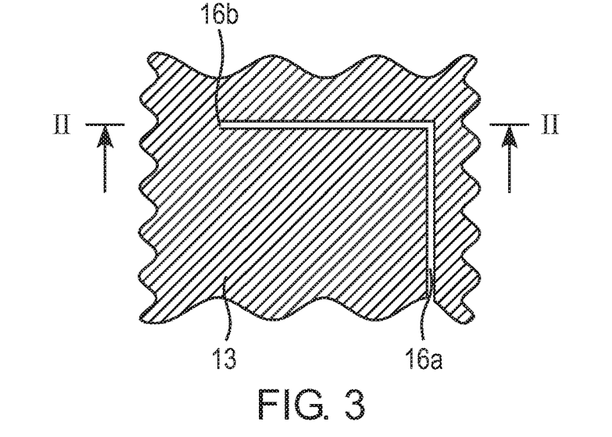
FIG. 3 shows a cutout in the form of a schematic plan view of the microfluidic analysis device along a line of FIG. 2.

In a way that is likewise known per se, the capillary system may be configured two-dimensionally in a plane of a typically layer-like structure of the microfluidic analysis device or alternatively three-dimensionally. In the latter case, the capillary system also extends in a direction perpendicular to the planes of the layers. FIGS. 2 and 3 illustrate such a three-dimensional capillary structure in a corresponding cutout of a microfluidic analysis device. As can be seen from it, the microfluidic analysis device in this case includes a capillary substrate 13, a cover substrate 14 adjacent to a top side 13a of the capillary substrate 13 and also a bottom substrate 15 adjacent to a bottom side 13b of the capillary substrate 13. In the example shown, the capillary substrate 13 is formed by two layers, an upper layer 13c and a lower layer 13d; in alternative embodiments, it may be formed as one part or consist of more than two layers. In the example shown, the substrates are planar, but non-planar substrates are alternatively also possible.

Integrated in the layer structure is a capillary structure 16, which comprises one or more capillaries 16a in one or more planes parallel to the layer substrates 13, 14, 15 and connecting fluid paths 16b, which constitute connections to the capillaries 16a running parallel to the planes of the layers. In the example shown, the connecting paths 16b are formed by through-holes, which extend vertically, i.e. perpendicularly in relation to the planes of the layers, through the capillary substrate 13 or through one or more of its layers 13c, 13b. Alternatively, the connecting paths may be formed by tubes, which connect the plane-parallel capillaries 16a to one another outside the layer structure, for example at side edges of the layer structure.

Figure 4:
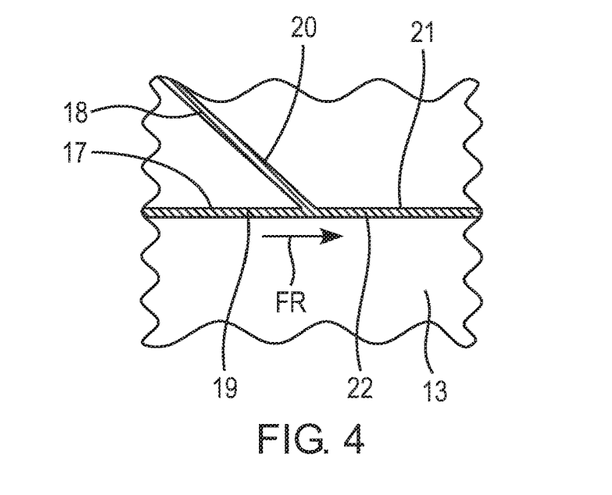
FIG. 4 shows a schematic plan view of a capillary system of a compartmentation part of a microfluidic analysis device.

FIG. 4 schematically illustrates a functional part integrated in a microfluidic analysis device for fluid compartmentation, which is to be understood as meaning the formation of separate reaction chambers within a fluid stream by fluid-fluid segments, for example by stable droplet formation. The compartmentation module may in particular be integrated in the microfluidic analysis device with a three-dimensional capillary system, in the manner of FIGS. 2 and 3, or alternatively with a two-dimensional capillary system. In this case, the capillary system includes a first capillary 17 and a second capillary 18, which enters the first capillary 17. A first fluid 19, for example a fluid to be analyzed, is fed into the first capillary 17. A second fluid 20, for example a separating fluid, is fed into the other capillary 18. The two capillaries 17, 18 run plane-parallel to the capillary substrate 13. In the example shown, the second capillary 18 enters the first capillary at an acute angle in relation to the direction of fluid flow FR of the first capillary 17.

Characteristically, in the present case the fluid compartmentation takes place by pressure-pulse-controlled feeding or conduction of each of the two fluids 19, 20 in their associated capillaries 17, 18. The pressure pulses required for this are realized for example by means of electronic control of solenoid or piezo valves, the opening times of the valves being varied individually in the range from several seconds to microseconds. In this case, pressure differences of the fluids 19, 20 involved of between approximately 10 bar and approximately 1 mbar or less may be implemented. The pressure pulses for the one fluid 19 on the one hand and the other fluid 20 on the other hand are suitably made to match one another, so that, when using two immiscible liquids, such as for example a water-based fluid to be analyzed and an oil serving for separating purposes, associated fluid interfaces are produced or retained in the capillary path downstream of the point of entry of the capillary 18 into the capillary 17, and in this way separate fluid-fluid segments form as compartment segments 21 of the fluid to be analyzed and separating segments 22 with the separating fluid. The volume of the individual segments 21, 22 may be set individually between several milliliters and one or a few nanoliters. Each segment 21, 22 may be considered as a droplet or a self-contained reagent volume. Depending on the application, dispersion-free liquid transports or monitored emulsions may be realized, in that the capillary geometries, the liquids used and the associated process parameters are chosen correspondingly, as is self-evident to a person skilled in the art.

In the example shown, the plane-parallel capillary portions 16a are located not only between the two capillary-substrate layers 13c, 13d in the interior of the capillary substrate 13 but also at the interface of the capillary substrate 13 with the cover substrate 14 and at the interface of the capillary substrate 13 with the bottom substrate 15. In this case, the outer capillary portions are respectively formed on the outer sides of the capillary substrate 13 and are covered by the cover substrate 14 or the bottom substrate 15, respectively. Alternatively, these outer capillaries may be entirely or partially formed by corresponding depressions in the cover substrate 14 or in the bottom substrate 15, respectively. The invention otherwise also comprises embodiments in which either the cover substrate or the bottom substrate is missing, and then only outer capillaries of the capillary substrate adjacent to the bottom substrate or the cover substrate are present.

For the rest, fluid conducting means known per se may be used for the fluid conduction in the capillary system according to FIG. 4, and similarly in the other systems mentioned and parts thereof, which therefore does not require any more detailed explanation here. The specific pressure pulse control may be implemented in particular in the control part of the analyzer from FIG. 1, and here in particular in the control unit 4 serving for the fluid handling, possibly assisted by the control software part 2.

Figure 5:
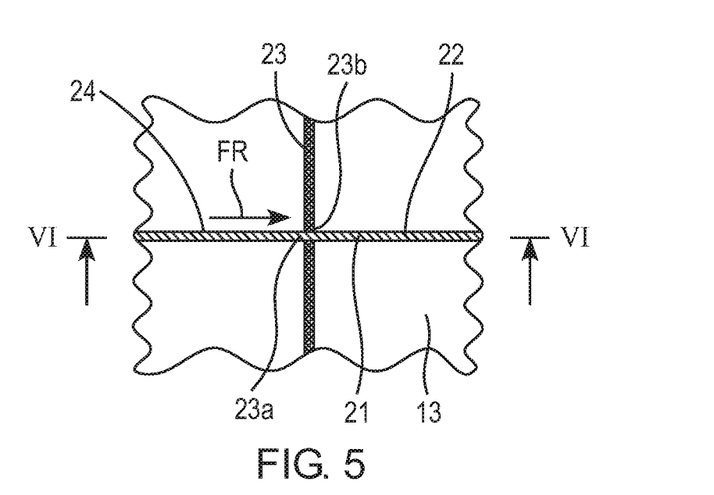
FIG. 5 shows a schematic plan view of a functional part for the optical fluid analysis of a microfluidic analysis device.
Figure 6:
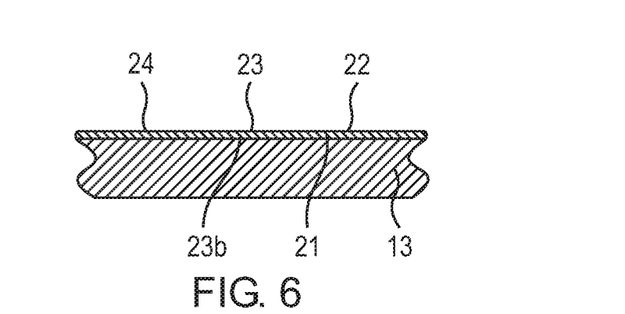
FIG. 6 shows a sectional view along a line VI-VI of FIG. 5.

FIGS. 5 and 6 illustrate a sensor module part, as may be an integral component part of a microfluidic analysis device in the manner of FIGS. 2 to 4, for example for realizing one of the two fluid analysis blocks 7, 10 in the analyzer from FIG. 1. The sensor part that is schematically shown in FIGS. 5 and 6 includes an optical sensor with an optical sensor element 23 integrated in the capillary system in the form of an optical waveguide or some other linear wire material of an optically conducting substance. The linear optical sensor element typically has a diameter of at most approximately 1 mm. With the aid of the optical sensor element 23, a fluid to be analyzed that is conducted in an analysis capillary 24 can be analyzed within the capillary 24 by excitation, attenuation and/or energy transfer with regard to its fluorescence concentration in the range from about 1 mM to about 1 nM. In addition, the optical sensor element 23 makes it possible to make a statement about the polarization, lifetime, light transmission, absorption and/or scattering of the fluid. The fluid to be analyzed is conducted in the capillary 24 in the individual compartments 21 mentioned above in relation to FIG. 4, which are separated from one another by the separating segments 22.

Characteristically, as shown, the linear sensor element 23 runs in the same plane as the fluid-conducting capillary 24, crossing the latter, for example at a right angle, and ends with a respective fluid contact end 23a, 23b flush with the capillary side wall concerned, with free contact with respect to the capillary cavity. As a result, during operation, the optical sensor element 23 is in direct contact with the fluid to be analyzed that is conducted in the capillary 24. As an alternative to finishing flush with the capillary side wall, the fluid contact ends 23a, 23b of the sensor element 23 may protrude into the cavity of the capillary 24 with a length set to a defined amount, for example several micrometers. The linear optical sensor element 23 is connected to the capillary substrate 13 in a fixed and fluid-tight manner by adhesion, casting, depositing, printing, melting or by some other conventional technique. The optical measurements carried out with the sensor element 23, for example under the control of the measurement computer 3 from FIG. 1, may be performed for example with sampling frequencies greater than 100 Hz.

In the example shown, the sensor element 23 extends on both sides of the capillary 24 toward and away from it. In alternative embodiments, the sensor element may also consist only of a linear element leading to the capillary or of a linear element leading away from the capillary. The characterization that the sensor element ends with its respective fluid contact end flush with the capillary side wall, with free contact with respect to the capillary cavity, should be understood in the present case as also including the case where the capillary has a lateral bulge or a blind hole going off to the side or a corresponding blind channel, up to which the sensor element extends with its fluid contact end, without having to extend right up to the height of the remaining hollow channel. All that is important in this respect is that in each case the sensor element is in direct contact with its fluid contact end with the fluid in the capillary.

While in the example shown the entire portion of the linear sensor element 23 that is shown lies in the plane of the capillary 24, in alternative embodiments a part of the sensor element that is away from the capillary may lie outside this plane. To this extent, all that is important is that in each case the fluid contact end itself, preferably also a part of the linear sensor element adjoining thereto, lies in the plane of the assigned capillary.

As an alternative to the optical sensor element mentioned, it is possible by analogy to use a linear electrical sensor element, which for this purpose correspondingly consists of an electrically conducting wire material, such as a metal or an electrically conducting composite substance. Also in this case, the electrically conducting sensor element may have direct contact with free fluid contact ends with the fluid to be analyzed that is conducted through the capillary, in that the fluid contact ends in turn finish flush with the capillary side wall or protrude into the capillary hollow channel with a defined length, for example several micrometers. Such a linear, electrically conducting sensor element typically has a diameter of at most approximately 1 mm and, acting together with suitable evaluation electronics, such as can be implemented for example in the measurement computer 3 from FIG. 1, allows a determination of the electrical conductivity of the fluid to be analyzed in the range of up to approximately 200 mS. The resistivity of the fluid to be analyzed can be determined or resolved in the range from about 1 mΩ to about 1MΩ. The electrically conducting wire material is connected to the capillary substrate 13 in a fixed and fluid-tight manner by adhesion, casting, depositing, printing, melting or by some other conventional technique. The measurements may be carried out for example in turn with sampling frequencies of more than 100 Hz.

Figure 7:
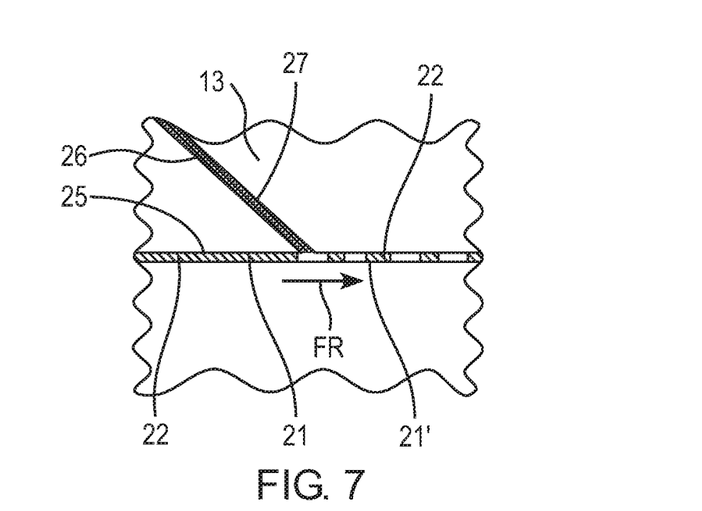
FIG. 7 shows a schematic plan view of a functional part for the fluid admixing of a microfluidic analysis device.

FIG. 7 illustrates schematically and in the form of a cutout a fluid admixing module, as in turn may be an integral component part of a microfluidic analysis device in the manner of FIGS. 2 to 4, in particular for realizing the fluid injection module block 8 in the analyzer from FIG. 1. The capillary structure of the fluid admixing module is similar to that of the compartmentation module from FIG. 4, in that it comprises a first capillary 25 and a second capillary 26, which enters the first capillary 25 for example at an acute angle in relation to the direction of fluid flow FR of the first capillary 25. In the first capillary 25, a fluid that has already been compartmented in advance is conducted upstream of the point of entry, i.e. the fluid stream there consists of the individual compartment segments 21 and the separating segments 22 separating them, as produced by the compartmentation module of FIG. 4. A fluid 27 to be admixed is fed into the other capillary 26.

The feeding of the fluid 27 to be admixed is performed in turn in a pressure-pulse-controlled manner in such a way that the fluid to be admixed is injected at the point of capillary entry specifically into the compartmentation segments 21, which remain separated by the separating segments 22. As a result, downstream of the point of entry there are compartment segments 21', which contain in addition to the inlet fluid the admixed fluid and continue to be separated from one another by the separating segments 22. With pressures of up to about 10 bar, the volume of admixing fluid to be injected can be set in the range between about 1 nl and about 1 ml by variation of the opening times of assigned valves between about 1 μs and several seconds. The valves may in this case in turn be arranged externally or integrated in the capillary system. It goes without saying that the fluid admixture can, according to requirements, be added into each compartment segment or alternatively only into selected compartment segments of the inlet fluid stream upstream of the admixing point, in that the pressure pulse control is set correspondingly.

Figure 8:
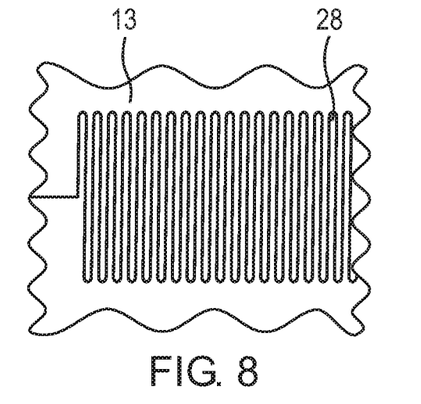
FIG. 8 shows a schematic plan view of an incubation module for a microfluidic analysis device.

FIG. 8 illustrates an incubation module, as may be integrated in a microfluidic analysis device or assigned externally to it, for example for using for the incubation functional blocks 6, 9 in the analyzer from FIG. 1. In the example shown, the incubation module includes a meandering capillary structure 28 in the capillary substrate 13 or an interface of the same in relation to a cover substrate or bottom substrate. Up to 107 fluid segments can be stored over several hours to days in this meandering capillary structure 28; alternatively, tubular incubation structures can also be used. In this case, the assignment between each fluid segment and its process parameters and also information regarding concentrations and injected reagents is retained. The ambient temperature of the incubation module can be regulated for controlling chemical or biological reactions. If required, the environment of the incubation module or the capillary structure may be enriched with process gases. The dwell time of each segment in the incubation module is individually set by means of preferably electronically controlled valves.

Figure 9:
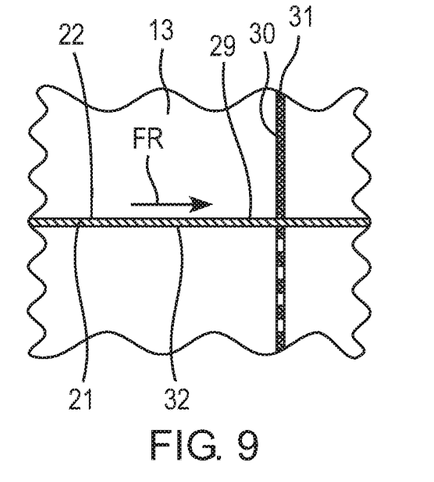
FIG. 9 shows a schematic plan view of a functional part for the fluid selection of a microfluidic analysis device.

FIG. 9 illustrates schematically and in the form of a detail a selection module, as may be integrated in a microfluidic analysis device, for example for providing the selection functional block 11 in the analyzer from FIG. 1. The selection module has a capillary structure on or in the capillary substrate 13, which comprises a capillary 29, which conducts the analyzed fluid, and a selection fluid capillary 30, which crosses the first capillary and into which a suppression fluid 31 is fed in turn in a pressure-controlled manner. The analyzed fluid stream in the capillary 29 consists of the sequence already mentioned several times of compartment segments 21 and separating segments 22. The crossing point of the two capillaries 29, 30 forms a point of separation, at which a predeterminable, selected fluid segment 32 to be selected is pushed out of the capillary 29 into the selection fluid capillary 30 by a corresponding pressure pulse on the selection fluid 31. In the selection fluid capillary 30, the selected fluid segments consequently lie sequentially downstream of the crossing point or point of separation, separated by a respective selection fluid segment. For the selection of the fluid segments, the selection fluid feeding is performed by way of regulated pressure pulses between about 0.1 bar and about 10 bar. These pressure pulses may be produced for example by opening times of electronically controlled valves in the range from about 1 µs to approximately 10 s. The volume of the fluid segment thus selected typically lies in the range from about 1 nl to about 1 ml.

Figure 10:
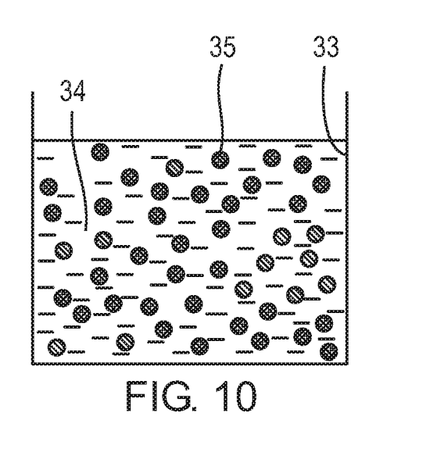
FIG. 10 shows a schematic representation of a storage container for the unordered storage of selected fluid segments for a microfluidic analysis device.
Figure 11:
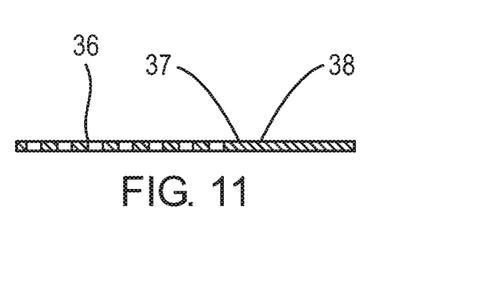
FIG. 11 shows a schematic representation of a tubular store for the ordered storage of selected fluid segments for a microfluidic analysis device.

FIGS. 10 and 11 illustrate two possible ways of realizing a storage module, as can be used for the storage functional block 12 in the analyzer from FIG. 1. FIG. 10 shows for this a storage container 33 in the form of a tank, which is filled with a liquid storage medium 34, which receives selected fluid segments 35 in a floating or suspended form. Since the selected fluid segments 35 are in this way dispensed in an unordered state in the collecting container 33, this represents a storage method that does not retain the segment assignment.

Alternatively, FIG. 11 shows a storage method in which the segment assignment with the associated process parameters and information on concentrations and injected reagents is retained. Serving for this purpose is a storage tube 36, in which selected fluid segments 37 are received sequentially and in such a way that they are separated from one another by separating segments 38. The segments 37 may in this case be dispensed into a previously determined location of a microtiter plate. The storage tube 36 may have a length between 1 m and 1000 m.

Figure 12:
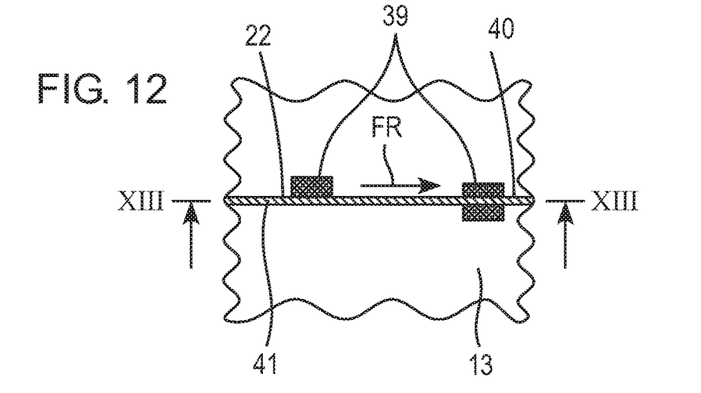
FIG. 12 shows a schematic plan view of a functional part for the flow/process control of a capillary structure of a microfluidic analysis device.
Figure 13:
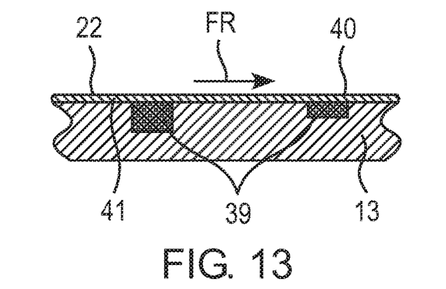
FIG. 13 shows a sectional view along a line XIII-XIII of FIG. 12.

FIGS. 12 and 13 schematically illustrate a cutout of a microfluidic analysis device with a capillary structure, which is assigned magnetic coils, which may for example act as sensors or actuators and are integrated in or on the capillary substrate 13. In the example shown, two solenoid coils 39 are arranged one behind the other at a predetermined distance in the direction of fluid flow on a capillary 40, which in turn serves for conducting the fluid flow of individual compartment fluid segments 41 that are separated from one another by separating segments 22. In the case shown, the two coils 39 are arranged directly on the capillary 40, on two sides offset by 90° about a longitudinal axis of the capillary 40. With coil dimensions and coil heights of less than about 6 mm, it is possible with such coils 39 to produce inductions of about 1 nH to about 10 mH with switching cycles of between about 0.01 Hz and about 100 kHz. By using magnetic particles in the fluid conducted in the capillary 40, in this way the flow conditions and process conditions within the capillary structure can be controlled or monitored.

Figure 14:
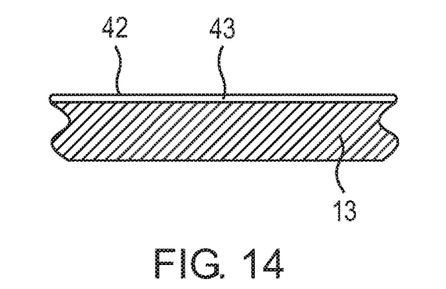
FIG. 14 shows a schematic sectional view of part of a capillary structure of a microfluidic analysis device with an integrated sensor element.

FIG. 14 illustrates in a sectional view similar to FIG. 6 a characteristic method step of the method according to the invention for producing a microfluidic analysis device. This method step includes the production of the capillary structure, in FIG. 14 specifically of a capillary 42 that is shown, by a step of machining the capillary substrate 13; depending on the application, alternatively or additionally machining the cover substrate and/or the bottom substrate. By producing the capillary 42 in this machining manner, a linear, optical or electrical sensor element 43 that crosses the capillary 42 or protrudes into it can also be structured. Structuring of the sensor element 43 should be understood here as meaning the production of a fluid contact end of the sensor element that lies flush with a side wall of the capillary 42 or extends over a predeterminable length into the hollow channel or, set back at a predetermined distance from this hollow channel, up to a bulge or a blind branch of the hollow channel. This structuring may include the cutting through of a sensor element running on both sides of the capillary 42 or the cutting off of a sensor element extending only on one side toward the capillary 42 or away from it. For this purpose, the sensor element 43 need not consist of a material that is the same as or similar to the capillary substrate 13; rather, producing the capillary structure and the sensor element fluid contact end in a machining manner allows a high degree of flexibility in the choice of the materials for the capillary system 13 on the one hand and the sensor element 43 on the other hand.

Figure 15:
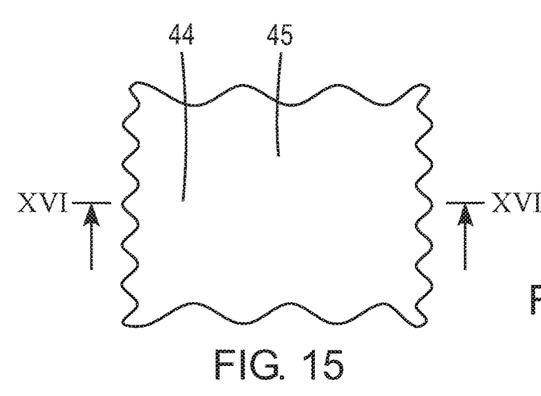
FIG. 15 shows a schematic plan view of a functional part of a microfluidic analysis device with an integrated flow control valve for a capillary structure.
Figure 16:
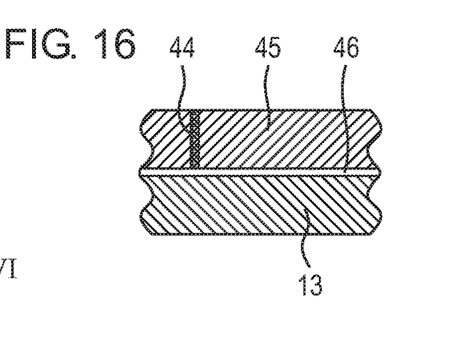
FIG. 16 shows a sectional view along a line XVI-XVI of FIG. 15 with the valve open.
Figure 17:
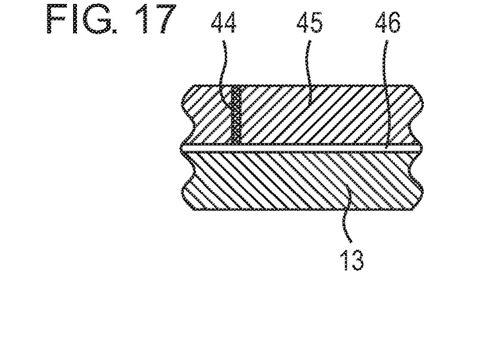
FIG. 17 shows a sectional view of FIG. 16 with the valve closed and FIG. 18 shows a schematic plan view of a microfluidic analysis device with integrated modules for compartmentation, fluid admixing, segment analysis and segment selection.

FIGS. 15 to 17 illustrate an already aforementioned advantageous integration of a fluid-controlling valve 44 in a cover substrate 45 of a layer structure with a capillary substrate 13 and a cover substrate 15. The valve 44 consists of a ductile material, such as silicone, and has been introduced into a vertical through-opening in the cover substrate 45 in such a way that, depending on the state of excitation, it keeps a capillary 46 lying thereunder open, as shown in FIG. 16, or closed, as shown in FIG. 17. By corresponding activation of the valve 44, the fluid stream through the capillary 46 can consequently be controlled from the outside in a desired way.

Figure 18:
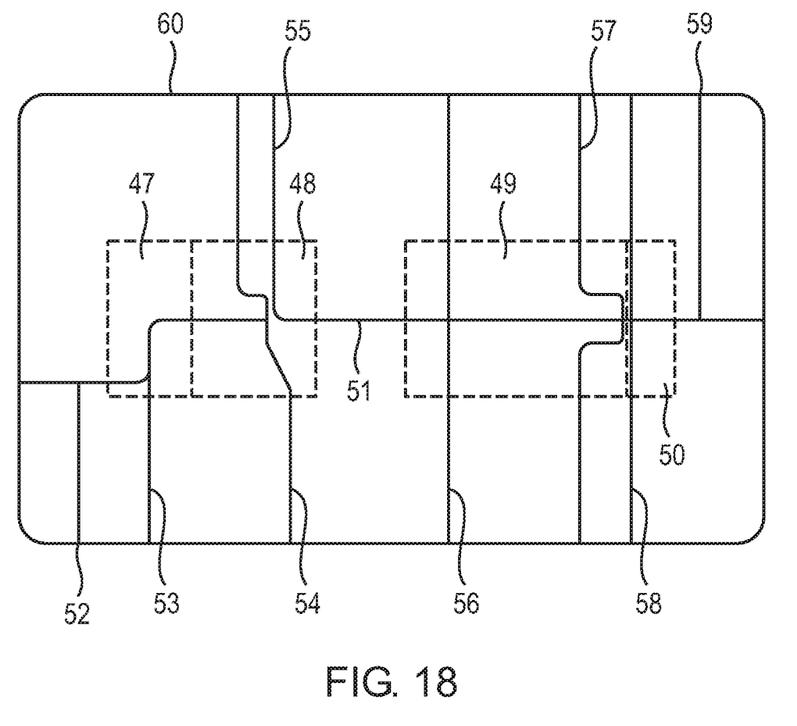

FIG. 18 schematically illustrates in a plan view a one-part microfluidic analysis device 60, which includes in an integrated form a compartmentation module 47, a fluid admixing module 48, a segment analysis module 49 and a selection module 50. On the input side, a separating liquid or an aqueous solution of fluid to be analyzed is fed to the compartmentation module 47, by way of a respective capillary 52, 53. The fluid to be analyzed leaves the compartmentation module 47 in the form of the compartments that are separated from one another by the separating segments in a capillary 51. The fluid admixing module 48 is assigned upstream of the admixing point a linear, preferably electrical sensor element 54, which acts as a first compartment detector. The fluid to be admixed is fed to the fluid admixing module 48 by way of a corresponding admixing fluid capillary 55. The position and sequence of the fluid compartments in the capillary 51 are detected by the compartment detector 54 and, depending thereon, the fluid to be admixed is added into the capillary 51 in a pressure-pulse-controlled manner.

The segment analysis module 49 is assigned a linear sensor element 56, which may be in particular an optical or electrical sensor element of the aforementioned type, which serves for the analysis of the compartmented fluid. On the output side of the segment analysis module 49 there is a second compartment detector 57, in order to detect there in turn the position and sequence of the fluid compartments. The adjoining selection module 50 is assigned a separation fluid capillary 58, which crosses the capillary 51 and into which a selection fluid is fed upstream of the capillary 51 in a pressure-pulse-controlled manner, in dependence on the detection of the fluid segments by the second compartment detector 57, and which receives downstream of the crossing point with the capillary 51 the fluid segments selected in this way, with their separation from one another by corresponding separation fluid segments. By way of an outlet 59, the remaining fluid in the capillary 51 then leaves the microfluidic analysis device 60 without the separated fluid segments.

It goes without saying that, in alternative embodiments, a microfluidic analysis device according to the invention may comprise only some of the four modules 47, 48, 49, 50 shown in FIG. 18, or any other desired combination of the modules or functional blocks such as are shown as a component part of the micro reactor 1 in the analyzer from FIG. 1.

The microfluidic analysis device according to the invention is suitable for various analytical applications and applications such as drug screening, enzyme, cell and/or protein optimization, antibody optimization or synthesizing and diagnostics.

As discussed above in the context of FIG. 11, a fluid segment storage tube such as storage tube 36 may be usable in other appliances, and the present invention includes approaches for pressure regulation, controls for operating, and use of fluid segment storage tube. The term fluid segment should be understood to cover so-called droplets, which are known the art to include small volumes of the fluid in question having contact to capillary walls, as well as small volumes of the fluid not having contact to the capillary walls. The term tube is used in the present application in the broad manner of its use in the art of microfluidic technology, and in particular includes a capillary as a storage tube.

The present invention's fluid segment storage tube is particularly suited to incubation activities, including incubation of cells of different organisms such as bacteria yeast, filamentous fungi, microalgae, mammalian cells and even multicellular organisms such as the Nematode Caenorhabditis elegans. Screening for better growth rates, higher productivity or other selection criteria of cell libraries in a large number of fluid segments requires all fluid segments to have the same volume, the same incubation time, and the same incubation conditions.

The same incubation time for fluid segments cannot be achieved in 2D or 3D vessels because the sequence in which the fluid segments are generated will be lost. As a consequence of the disorder present in 2D and 3D vessels, it is not possible to ensure equal timing between generation of fluid segment, incubation and emptying the vessel. These different incubation times of the fluid segments lead to different time points in the growth phase of each fluid segment, which is disadvantageous in screening of large numbers of fluid segments for cell growth and/or cell productivity due to the increased variation of incubation time for different fluid segments.

In a tube or capillary according to the invention the sequential order for generated fluid segments can be maintained, where the geometry of such a tube or capillary is determined to not allow fluid segments to overtake each other. For screening a large number of fluid segments, the length of the tube or capillary needs to be long enough to store the number of fluid segments to be screened in a single tube or capillary. Alternatively to using a single tube or capillary, a significant part of the fluid segments can be stored in parallel tubes or capillaries.

The filling of tubes or capillaries with fluid segments of a constant volume is challenging because the flow resistance of the tube or capillary during filling and emptying is depending on the number and volume of fluid segments contained in the tube or capillary. This leads to differences in the volumes of the generated fluid segments over the length of the tube or capillary when a constant pressure is applied, as it is the case for common microfluidic applications. In order to maintain a constant volume of fluid segments generated in tubes or capillaries, an active regulation of the pressure and/or the fluid flow is required during generation of fluid segments. Such pressure regulation may be applied at several points of the system. For example, pressure can be applied to the feeding tube or capillary of the fluid segment generation and/or to the outlet of the capillary or tube. The pressure may be increased or decreased in order to remain a constant fluid segment volume.

Alternatively, pumps and/or flow generating systems in any execution may be applied at several points of the fluidic system. Furthermore, constant fluid segment volume can be achieved using controlled pressure pulses, as discussed above. Such pressure pulses may be varied in duration in order to maintain same fluid segment volumes over the lengths of the tube or capillary. It is also possible to have a combination of controlled pressure regulation and pressure pulses.

Emptying the fluid segment storage tubes or capillaries with incubated fluid segment with constant volume may be done, for example, by connecting the tubes or capillaries to the fluid segment generation system of the present invention, or applying a variable pressure at the inlet of the storage capillary or tube in order to move the fluid segments. Further, it is possible to apply the same speed as it was applied during the generation of fluid segments. The same techniques may be used for filling the capillary or tube without fluid segment generation. The pressure variation may be applied to the separation fluid or to the fluid segment fluid or to one or more different fluids.

As noted above, having a sequential order and a constant volume of fluid segments, the same incubation time for all generated fluid segments is an indispensable condition in order to achieve same incubation conditions for each fluid segment. By adjusting the flow rate for emptying tubes or capillaries with incubated fluid segments and for the fluid segment generation and/or filling of the tube or capillary with fluid segment, a constant incubation time for all fluid segments is achievable. For example, the time for filling and emptying tubes or capillaries can be chosen to be identical. Alternatively, filling several tubes or capillaries can be faster or slower than emptying the tubes or capillaries. In this case, time differences may be individually equalized by aligning the incubation time of each tube or capillary with the filling and emptying duration.

The incubation time depends on the length and geometry of the tube or capillary and/or the speed of the fluid segments to pass the tube or capillary. During storage, fluid segments may be stored in the tube or capillary without movement. Alternatively, stored fluid segments may be moved backward and/or forward for a defined time and speed.

The disadvantage of stopping the generation of fluid segments during storage time may be avoided by operating with parallel tubes or capillaries which are connected and/or disconnected automatically or manually to the fluid segment generation system and/or triggered by valves to allow to stop filling and emptying. With such an arrangement, it is possible to incubate very large numbers of fluid segments under utmost identical conditions.

Incubation time is one parameter to archive identical incubation conditions. Further important parameters are incubation temperature and gas supply. Temperature varies from strain to strain. Whereas most of cells are growing between 30 and 40° C., several cells grow between 0° C. and 100° C. Gas supply is also critical for aerobic strains with air and for anaerobic strains for gas mixtures without oxygen. There are several strains requiring different gas mixtures for growth such as methane or carbon monoxide and hydrogen. In order to maintain same temperature and gas supply for all fluid segments, the tube or capillary should be exposed to identical conditions. This allows same temperature and gas supply for each fluid segment. Identical temperature exposure for the fluid segments may be achieved by heating the material of the tube or capillary which results in a heat transfer to the fluid segments.

To ensure a defined gas transfer, separation fluid between fluid segments may buffer gas which may be fed to fluid segments and/or uptake off-gas such as carbon dioxide from cells within fluid segments. The separation fluid might be enriched by a specific gas and/or drained off off-gas before usage in the tube or capillary in order to increase or reduce its capacity for carrying dissolved gas. The transfer of gas through the material of the tube or capillary may provide greater flexibility and/or a larger capacity. When the tube or capillary material is permeable for desired gases such as $O_2$ and/or $CO_2$, the cells may be fed constantly with gas and off-gas can be drained off. Ideally, the transfer of gas through the material of the tube or capillary should be higher than the uptake of gas by cells within each fluid segment. In any case, this arrangement provides the same gas supply to all fluid segments.

In establishing the same conditions for the incubation of fluid segments, it is important to define a volume of the fluid segment in which cells are to be incubated. When choosing small picoliter fluid segments, it is known that exponential growth is may be difficult to achieve, e.g., for filamentous fungi and mammalian cells. Using fluid segments in microliter to milliliter range for large number screening, the volumes to process are quite large and screening gets expensive.

It has been determined that a good compromise is the range of nanoliter fluid segments. This volume is still small but cells can grow for several generations in the exponential phase. When starting from a single or a few cells inoculation of fluid segments with a volume between the higher picoliter or nanoliter range, the incubation time for reaching sufficient cell concentration for further analysis ranges, for example, between a few hours for fast growing bacteria with a doubling time of 30 minutes for 100 nanoliter fluid segments, to a few days for mammalian cells with a doubling time of 15 hours.

There is a very significant advantage to being able to keep cells in the exponential growth phase for several generations, as is possible with nanoliter fluid segments for many cell types. If the incubation time is well defined for each fluid segment and incubation conditions are identical, the screening for growth rate and/or productivity during the exponential growth phase provides performance of cell clones much more efficiently and effectively than compared to fluid segments with single-cell stage or fluid segments with cells in the lag-phase, or fluid segments with outgrown cells in the stationary phase where all different cell clones are limited by their growth or even stopped to grow.

The foregoing disclosure has been set forth merely to illustrate the invention and is not intended to be limiting. Because other such modifications of the disclosed embodiments incorporating the spirit and substance of the invention may occur to persons skilled in the art, the invention should be construed to include everything within the scope of the appended claims and equivalents thereof.

What is claimed is:

1. A microfluidic incubation device, comprising:
   a control device having at least one of a pressure regulation device, a flow rate regulation device, and a valve arrangement device, and
   at least one fluid segment storage tube configured to be connected to at least one of the pressure regulation device, the flow rate regulation device, and the valve arrangement during at least one of filling the at least one storage tube with fluid segments and emptying the at least one storage tube of fluid segments,
   wherein the at least one fluid segment storage tube has a length of at least 1 meter to 1000 m, and
   wherein the control device is configured to sequentially generate fluid segments with equal volume using at least one of active pressure regulation and active fluid flow regulation.

2. The microfluidic incubation device as claimed in claim 1, wherein
   the control device is configured to transfer fluid segments sequentially into the storage tube for a predetermined incubation time.

3. The microfluidic incubation device as claimed in claim 2, wherein the incubation time is equal for each one of the fluid segments.

4. The microfluidic incubation device as claimed in claim 2, wherein, the incubation time is between 1 second and 4 weeks.

5. The microfluidic incubation device as claimed in claim 2, wherein, the incubation time is between 1 minute and 2 weeks.

6. The microfluidic incubation device as claimed in claim 2, wherein the incubation time is between 30 minutes and 1 week.

7. The microfluidic incubation device as claimed in claim 1, wherein
the control device is configured to change at least one of a pressure, a flow rate, and a valve opening time during generation from a first to a last fluid segment for filling or emptying the at least one storage tube by more than 5%.

8. The microfluidic incubation device as claimed in claim 7, wherein
the control device is configured to change the pressure by at least 5% during filling the storage tube with fluid segments between 1 mbar and 100 bar or between 100 mbar and 10 bar or between 1 bar and 4 bar.

9. The microfluidic incubation device as claimed in claim 7, wherein
the control device is configured to change the pressure by at least 5% during filling the storage tube with fluid segments between 1 bar and 4 bar.

10. The microfluidic incubation device as claimed in claim 7, wherein
the control device is configured to change the valve opening time between 1 µs and 10 s.

11. The microfluidic incubation device as claimed in claim 7, wherein the control device is configured to change the valve opening time between 100 µs and 50 ms.

12. The microfluidic incubation device as claimed in claim 1, wherein
the at least one storage tube is configured for incubation of more than two of the fluid segments,
the length of the at least one storage tube is a multifold of a diameter of incubated fluid segments, the multifold value being from 10 to $10^9$ fold.

13. The microfluidic incubation device as claimed in claim 1, wherein
the at least one storage tube is configured for incubation of more than two of the fluid segments,
the length of the at least one storage tube is a multifold of a diameter of incubated fluid segments, the multifold value being from $10^3$ to $10^6$ fold.

14. The microfluidic incubation device as claimed in claim 12, wherein
the length of the at least one storage tube is between 20 m to 40 m.

15. The microfluidic incubation device as claimed in claim 1, wherein
the fluid segments each have a volume between 10 picoliters to 10 µl.

16. The microfluidic incubation device as claimed in claim 1, wherein
the fluid segments each have a volume between 10 nanoliters to 500 nanoliters.

17. The microfluidic incubation device as claimed in claim 15, wherein
at least some of the fluid segments have a volume sufficient to accommodate an exponential cell growth over 1 to 1000 generations.

18. The microfluidic incubation device as claimed in claim 15, wherein
at least some of the fluid segments have a volume sufficient to accommodate an exponential cell growth over 3 to 10 generations.

19. The microfluidic incubation device as claimed in claim 1, wherein
the at least one storage tube includes a plurality of parallel storage tubes, and
at least two of the plurality of parallel storage tubes are configured to provide all fluid segments in the at least two of the plurality of parallel storage tubes with equal incubation times during an operation in which the at least two of the plurality of parallel storage tubes are filled and emptied in a sequential order.

20. The microfluidic incubation device as claimed in claim 1, wherein
the at least one storage tube has a fluid segment capacity between 10 to $10^9$ fluid segments.

21. The microfluidic incubation device as claimed in claim 1, wherein
the at least one storage tube has a fluid segment capacity between $10^5$ to $10^7$ fluid segments.

22. The microfluidic incubation device as claimed in claim 1, wherein
the at least one storage tube is permeable for at least one of $O_2$ and $CO_2$.

* * * * *